United States Patent
Kim et al.

(10) Patent No.: US 10,601,075 B2
(45) Date of Patent: Mar. 24, 2020

(54) METHOD FOR SYNTHESIZING HYDROCARBON ELECTROLYTES POLYMER AND POLYMERIZATION SOLVENT USED THEREIN

(71) Applicants: YOULCHON CHEMICAL CO., LTD., Seoul (KR); KOREA INSTITUTE OF SCIENCE AND TECHNOLOGY, Seoul (KR)

(72) Inventors: Hyoung-Juhn Kim, Seoul (KR); Jong Hyub Park, Ansan-si (KR); Jin Ho Kim, Gunpo-si (KR); So Young Lee, Seoul (KR)

(73) Assignees: YOULCHON CHEMICAL CO., LTD., Seoul (KR); KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 487 days.

(21) Appl. No.: 14/718,170

(22) Filed: May 21, 2015

(65) Prior Publication Data
US 2015/0340735 A1 Nov. 26, 2015

(30) Foreign Application Priority Data
May 22, 2014 (KR) .................. 10-2014-0061763

(51) Int. Cl.
C08G 75/23 (2006.01)
C08G 75/20 (2016.01)
H01M 10/0565 (2010.01)

(52) U.S. Cl.
CPC ........ H01M 10/0565 (2013.01); C08G 75/20 (2013.01); C08G 75/23 (2013.01)

(58) Field of Classification Search
CPC .... C08G 75/20; C08G 75/23; H01M 10/0565
USPC ............................................ 521/25; 252/364
See application file for complete search history.

(56) References Cited

U.S. PATENT DOCUMENTS

| | | | | |
|---|---|---|---|---|
| 5,556,619 A * | 9/1996 | Royce | .................. | A61K 31/787 424/78.01 |
| 5,601,905 A * | 2/1997 | Watanabe | ................ | G03F 7/094 428/213 |
| 5,633,344 A * | 5/1997 | Figuly | .................. | A61K 31/787 424/78.01 |
| 6,682,988 B1 * | 1/2004 | Babcock | ................ | G03F 7/165 257/E21.024 |
| 6,896,965 B1 * | 5/2005 | Hossainy | ................ | A61L 27/34 428/411.1 |
| 7,135,485 B2 * | 11/2006 | Wizel | .................... | C07D 417/12 514/342 |
| 7,175,873 B1 * | 2/2007 | Roorda | .................. | A61L 31/10 427/2.14 |
| 8,173,323 B2 | 5/2012 | An et al. | | |
| 2003/0118885 A1 * | 6/2003 | Terahara | ................ | C08J 5/2287 429/493 |
| 2004/0063805 A1 * | 4/2004 | Pacetti | .................... | A61L 31/10 523/113 |
| 2005/0165213 A1 * | 7/2005 | Dang | .................. | C08G 75/0204 528/373 |
| 2009/0111027 A1 * | 4/2009 | Lalgudi | .................. | C08G 65/40 429/310 |
| 2009/0130517 A1 * | 5/2009 | Miyachi | ............. | B01D 67/0009 429/535 |
| 2010/0167165 A1 * | 7/2010 | Masui | .................... | C08G 75/23 429/492 |
| 2011/0033774 A1 * | 2/2011 | Yamashita | ............. | C08G 61/12 429/483 |
| 2011/0311816 A1 | 12/2011 | Kanomata et al. | | |
| 2013/0079469 A1 * | 3/2013 | Schuster | ................ | C08J 5/2256 525/153 |
| 2013/0253080 A1 | 9/2013 | Lee et al. | | |
| 2014/0194581 A1 | 7/2014 | Kim et al. | | |
| 2014/0329169 A1 | 11/2014 | Kim et al. | | |

FOREIGN PATENT DOCUMENTS

| | | |
|---|---|---|
| CN | 101016443 A | 8/2007 |
| CN | 101445601 A | 6/2009 |
| CN | 101848956 A | 9/2010 |

(Continued)

OTHER PUBLICATIONS

Harrison, W. L. Synthesis and characterization of sulfonated poly(arylene ether sulfone) copolymers via direct copolymerization: candidates for proton exchange membrane fuel cells. Dissertation. Virginia Polytechnic Institute and State University. pp. 72-76 and 87-96. 2002. (Year: 2002).*

Lee at al. Synthesis of high molecular weight sulfonated poly(arylene ether sulfone) copolymer without azeotropic reaction. Solid State Ionics, 2015, 275, 92-96. (Year: 2015).*

Communication, dated May 17, 2016, from the Japanese Patent Office in counterpart Japanese application No. 2015-103831.

(Continued)

Primary Examiner — Stephen E Rieth
(74) Attorney, Agent, or Firm — Sughrue Mion, PLLC

(57) ABSTRACT

As a polymerization solvent for use in the polymerization of monomers for a hydrocarbon-based electrolyte polymer, a mixed solvent containing a first solvent, such as dimethyl acetamide, N-methylpyrrolidone or dimethyl sulfoxide, and an alcohol as a second solvent is used instead of a dimethyl acetamide/toluene mixture or dimethyl acetamide alone according to the related art. By using the mixed solvent, it is possible to obtain a molecular weight of polymer equal to or higher than the molecular weight of polymer obtained from the method according to the related art, even when the reaction time is reduced. Therefore, the disclosed method and polymerization solvent is very useful for a mass production of a hydrocarbon-based electrolyte polymer.

6 Claims, 1 Drawing Sheet

(56) References Cited

FOREIGN PATENT DOCUMENTS

| | | |
|---|---|---|
| JP | 2010-1446 A | 1/2010 |
| JP | 2014-005468 A | 1/2014 |
| KR | 10-2013-0106558 A | 9/2013 |
| KR | 10-1370806 B1 | 3/2014 |
| KR | 10-2014-0057108 A | 5/2014 |
| WO | WO-2013149328 A1 * 10/2013 ............. C08G 73/18 |

OTHER PUBLICATIONS

German Patent Office, Communication dated Aug. 3, 2016 in counterpart German Application No. 10 2015 107 830.9, with English translation.
German Patent and Trademark Office; Communication dated Jan. 22, 2019 issued in counterpart German Application No. 10 2015 107 830.9.

* cited by examiner

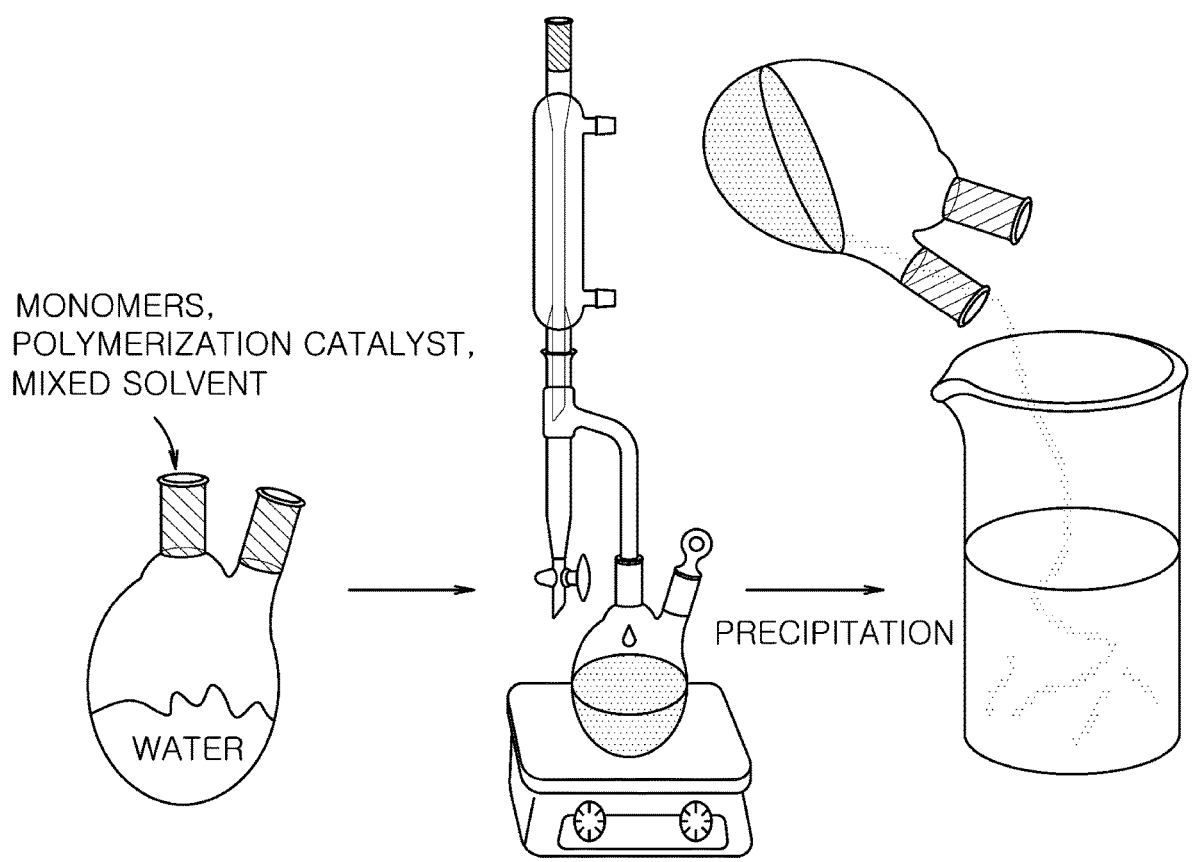

METHOD FOR SYNTHESIZING HYDROCARBON ELECTROLYTES POLYMER AND POLYMERIZATION SOLVENT USED THEREIN

CROSS-REFERENCE TO RELATED APPLICATION

This application claims priority to Korean Patent Application No. 10-2014-0061763, filed on May 22, 2014, and all the benefits accruing therefrom under 35 U.S.C. § 119, the contents of which in its entirety are herein incorporated by reference.

BACKGROUND

1. Field

The present disclosure relates to a method for synthesizing a hydrocarbon-based electrolyte polymer and a polymerization solvent used therein.

2. Description of the Related Art

Properties required for an electrolyte membrane for a polymer electrolyte fuel cell may include a high proton conductivity, high mechanical properties, a low fuel permeability, a high dimensional stability, high inert characteristics and low cost.

As an electrolyte membrane for a polymer electrolyte fuel cell according to the related art, fluorocarbon-based electrolyte polymer membranes such as Nafion®, Flemion®, Aciplex™ membranes etc. are known. Although such membranes have a high proton conductivity, high inert characteristics and good mechanical properties, a high fuel permeability, a low proton conductivity under the conditions of low-moistening and high temperature and particularly high cost are still problematic.

Thus, low cost hydrocarbon-based electrolyte polymers which may substitute for the fluorocarbon-based electrolyte polymers have been developed. Typically, the hydrocarbon-based electrolyte polymers applied to fuel cells have been obtained by a direct polycondensation of aromatic ether bond-containing polymers, such as polyarylene ether sulfone or polyarylene ether ketone, using a sulfonated monomer.

Such a direct polycondensation method essentially requires a process of inducing ether bonds between monomers. Particularly, during the process, an azeotropic mixing solvent including a low-boiling point solvent, such as dimethyl acetamide, N-methylpyrrolidone or dimethyl sulfoxide, and a high-boiling point solvent, such as toluene or cyclohexane, may be used to induce a dehydration. However, the use of such an azeotropic mixture may lower a solubility of monomers required for polymerization, thereby making it difficult to carry out a homogeneous polymerization and causing a polymerization reproducibility problem.

To address the problems, there has been suggested a technique using a dimethyl acetamide allone as a polymerization solvent instead of the azeotropic solvent (Korean Patent Laid-Open No. 2013-0106558). In the technique, a polymerization is carried out under a single polymerization temperature without using a complicated polycondensation adopting the azeotropic solvent, such as toluene, and the polymerization solvent.

However, according to an observation by the inventors of the present disclosure, such technique is not amenable to a mass production, because a long reaction time is required to obtain a desired molecular weight of polymer. Thus, the technique is still required to be improved.

SUMMARY

The present disclosure is directed to a method for synthesizing a hydrocarbon-based electrolyte polymer which may provide a high molecular weight of polymer even though a reaction time is reduced, and thus fit for a mass production, as opposed to the method for synthesizing a hydrocarbon-based electrolyte polymer using the dimethyl acetamide according to the related art. The present disclosure is also directed to a polymerization solvent used for the above-mentioned method.

In some embodiments, provided is a method for synthesizing a hydrocarbon-based electrolyte polymer, including heating and polymerizing a mixture containing a monomer for polymerizing a hydrocarbon-based electrolyte polymer, a polymerization catalyst and a solvent, wherein the solvent is a mixed solvent of a first solvent and a second solvent, the first solvent is at least one selected from the group consisting of dimethyl acetamide, N-methylpyrrolidone and dimethyl sulfoxide, and the second solvent is an alcohol (such as methanol, ethanol, isopropanol, etc.).

In some other embodiments, provided is a polymerization solvent for use in synthesizing a hydrocarbon-based electrolyte polymer, wherein the solvent is a mixed solvent of a first solvent and a second solvent, the first solvent is at least one selected from the group consisting of dimethyl acetamide, N-methylpyrrolidone and dimethyl sulfoxide, and the second solvent is at least one selected from various alcohols.

According to the embodiments, it is possible to obtain a molecular weight of polymer equal to or higher than the molecular weight of polymer obtained from the method according to the related art, even when a reaction time is reduced. Thus, the method and polymerization solvent disclosed herein is very useful for a mass production of a hydrocarbon-based electrolyte polymer.

BRIEF DESCRIPTION OF THE DRAWINGS

FIG. 1 is a schematic view illustrating a method for synthesizing a hydrocarbon-based electrolyte polymer according to an example embodiment.

DETAILED DESCRIPTION

Example embodiments now will be described more fully hereinafter with reference to the accompanying drawings, in which example embodiments are shown. The present disclosure may, however, be embodied in many different forms and should not be construed as limited to the example embodiments set forth therein. Rather, these example embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the invention. As used herein, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item. The terms "first," "second," and the like do not imply any particular order, but are included to identify individual elements. Moreover, the use of the terms first, second, etc. do not denote any order or importance, but rather the terms first, second, etc. are used to distinguished one element from another.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

In example embodiments, as a polymerization solvent for use in the polymerization of monomers for a hydrocarbon-based electrolyte polymer, a mixed solvent containing a first solvent, such as dimethyl acetamide, N-methylpyrrolidone, dimethyl sulfoxide, etc. and a second solvent, alcohol such as methanol, ethanol, isopropanol, etc. is used, instead of a dimethyl acetamide/toluene mixture or dimethyl acetamide alone according to the related art. By using such a mixed solvent, it is possible to obtain a molecular weight of polymer equal to or higher than the molecular weight of polymer obtained from the method according to the related art, even though a polymerization reaction time is reduced (i.e., it is possible to obtain substantially the same molecular weight of polymer at a shorter reaction time and to obtain a higher molecular weight at the same reaction time, as compared to the method according to the related art).

Particularly, in the method for synthesizing a hydrocarbon-based electrolyte polymer according to an example embodiment, a monomer for a hydrocarbon-based electrolyte polymer, a polymerization catalyst and a solvent are mixed to form a mixture, which, in turn, is heated to carry out polymerization.

The solvent is a mixed solvent of a first solvent (at least one of dimethyl acetamide, N-methylpyrrolidone, dimethyl sulfoxide, etc.) and a solvent (alcohol).

According to an example embodiment, the first solvent and the second solvent may be mixed at a ratio (volume ratio) of 15-30 mL (first solvent):10-20 mL (second solvent). When the amount of alcohol is small, the effect of obtaining a high molecular weight of polymer at a reduced reaction time may be insufficient. Meanwhile, when the amount of alcohol is excessively large, alcohol may function as a non-solvent, thereby causing a precipitation of polymer during the polymerization.

According to an example embodiment, the first solvent may preferably be dimethyl acetamide, N-methylpyrrolidone or dimethyl sulfoxide.

According to an example embodiment, alcohol, the second solvent, may preferably be methanol, ethanol or isopropanol.

In an non-limiting example, the first solvent may be dimethyl acetamide and the second solvent may be methanol. In another non-limiting example, the first solvent may be dimethyl acetmide and the second solvent may be ethanol. In still another example, the first solvent may be dimethyl acetamide and the second solvent may be isopropanol (see the following Examples).

According to example embodiments, unlike the method according to the related art, polymerization may be carried out by heating a reaction mixture to a polymerization temperature (e.g. 150-170° C.) without reflux. In addition, the second solvent evaporated during the polymerization reaction and water produced from the polymerization reaction may be removed with ease. In removing the second solvent evaporated and water produced from the reaction, it may be useful to adopt a Dean Stark system (Dean Stark apparatus).

FIG. 1 is a schematic view illustrating a method for synthesizing a hydrocarbon-based electrolyte polymer according to an example embodiment.

As shown in FIG. 1, according to an example embodiment, it is preferable that a Dean Stark distillation apparatus is used for the polymer synthesizing.

When using the Dean Stark distillation apparatus, the evaporated second solvent and water may be removed easily through a condenser of the Dean Stark apparatus.

An ethanol and isopropanol may form an azeotropic mixture with water so that water may be removed easily at a temperature lower than 100° C., thereby facilitating dehydration. It is thought that this helps obtaining a molecular weight of polymer equal to or higher than the molecular weight of polymer obtained from the method according to the related art, while reducing the reaction time, as opposed to the method according to the related art. In addition, it is thought that an alcohol may stabilize a potassium phenoxide produced first in the course of polymerization, and thus helps the subsequent polymerization process to be carried out rapidly.

In a non-limiting example, the hydrocarbon-based electrolyte polymer is sulfonated polyether sulfone or polyarylene ether ketone.

In a non-limiting example, the monomer may be 4,4'-dihydroxydiphenyl or bisphenol A; bis(4-chlorophenyl) sulfone or bis(4-fluorophenyl)sulfone; and 3,3'-disulfonated-4,4'-chlorodiphenylsulfone or 3,3'-disulfonated-4,4'-fluorodiphenylsulfone. The molar ratio of those monomers may be, for example, 1:0.6:0.4.

It will be understood though that the method according to the embodiments is not limited to said monomers and molar ratio, and may be applied to other preparation of a sulfonated polymer with a different molar ratio, monomers, etc.

According to an example embodiment, the polymerization catalyst may be a general polymerization catalyst for use in the polymerization of a hydrocarbon-based electrolyte polymer. Particular examples of such a catalyst may include, but is not limited to, a carbonate catalyst, such as potassium carbonate, sodium carbonate or cesium carbonate.

In a non-limiting example, the polymerization catalyst may be mixed with a monomer (e.g., 4,4'-dihydroxydiphenyl) at an equivalent ratio of 1.1-2.

According to an example embodiment, the method may include dissolving the mixture in the mixed solvent and carrying out polymerization at 150-170° C. for 15-20 hours to obtain a molecular weight of polymer (weight average molecular weight) of 100,000-250,000.

The examples and experiments will now be described. The following examples and experiments are for illustrative purposes only and not intended to limit the scope of the present disclosure.

EXAMPLES

To a 250 mL four-neck flask, a mechanical stirrer, a thermometer, a Dean-Stark trap and a condenser are mounted, and monomers, solvents, a catalyst are introduced under argon gas atmosphere.

As for the monomers, 3,3'-disulfonated-4,4'-chlorodiphenylsulfone (1.9650 g, 4 mmol), bis(4-chlorophenyl)sulfone (1.7230 g, 6 mmol) and 4,4'-dihydroxydiphenyl (1.8809 g, 10 mmol) are used and a sulfonation degree was set to 40%.

As for the solvents, Dimethyl acetamide is introduced in an amount of 22 mL corresponding to about 4 times of the total weight of monomers, and ethanol is introduced in an amount of about 11 mL.

Potassium carbonate as a catalyst is introduced in an amount of about 1.67 g corresponding to excess of about 1.2 times based on the molar ratio to 4,4'-dihydroxy diphenyl.

The reactants are heated directly to a polymerization temperature of 160° C. without any special low-temperature reflux process. Water produced from the reaction and ethanol is removed through the Dean-Stark trap.

To determine the reaction rate of polymer, polymerization is carried out at 160° C. for 5, 10, 15 or 20 hours to obtain a polymer. In addition, the same procedure is repeated to obtain a polymer, except that methanol (Example 2) and isopropanol (Example 3) is used instead of ethanol (Example 1). The highly viscous copolymer solution is precipitated in a mixed solution of isopropyl alcohol with distilled water (7:3) to obtain a polymer. The resultant polymer is filtered and then dried at 120° C. for 24 hours under vacuum.

The following Table 1 shows each molecular weight, reaction time, etc. according to Example 1, Example 2 and Example 3.

COMPARATIVE EXAMPLES

To a 250 mL four-neck flask, a mechanical stirrer, a thermometer, a Dean-Stark trap and a condenser are mounted, and monomers, solvent(s), a catalyst are introduced under argon gas atmosphere.

As for the monomers, 3,3'-disulfonated-4,4'-chlorodiphenylsulfone (1.9650 g, 4 mmol), bis(4-chlorophenyl)sulfone (1.7230 g, 6 mmol) and 4,4'-dihydroxydiphenyl (1.8809 g, 10 mmol) are used and a sulfonation degree was set to 40%.

Dimethyl acetamide as a solvent is introduced in an amount of 22 mL corresponding to about 4 times of the total weight of monomers, and toluene, which is an azeotropic solvent, is introduced in an amount of about 11 mL.

Potassium carbonate as a catalyst is introduced in an amount of about 1.67 g corresponding to excess of about 1.2 times based on the molar ratio to 4,4'-dihydroxy diphenyl.

The reactants are heated a temperature of 140° C. so that they are subjected to reflux with toluene. Reflux is carried out for about 5 hours to sufficiently remove toluene and water as a byproduct at the reflux temperature.

Toluene starts to be removed from the Dean-Stark trap when water removed through the Dean-Stark trap is not observed any more, and the reactor is heated to a temperature of 160° C. and reaction is carried out for about 20 hours. The highly viscous copolymer solution is precipitated in a mixed solution of isopropyl alcohol with distilled water (7:3) to obtain a polymer. The resultant polymer is filtered and then dried at 120° C. for 24 hours under vacuum.

The following Table 1 shows a molecular weight, a reaction time, etc, according to Comparative Example 1.

Meanwhile, Comparative Example 2 is carried out in the same manner by using the same reaction solvent and reaction time as Comparative Example 1, except that no Dean-Stark trap is used.

Further, Comparative Example 3 is carried out in the same manner as Comparative Example 1, except that no toluene is used. Since no toluene is used, the reaction is carried out for a total reaction time of 20 hours.

Table 1 shows each reaction apparatus, reaction solvent, reaction time, and molecular weight of resultant polymer according to Examples and Comparative Examples.

TABLE 1

| | Dean-Stark trap | Reaction temperature (° C.) | Solvent(s) | Reaction time (h) | Molecular weight* |
|---|---|---|---|---|---|
| Comp. Ex. 1 | Used | 140->160 | DMAc + toluene | 25 | 161,906 |
| Comp. Ex. 2 | Not used | 140->160 | DMAc + toluene | 25 | 14,555 |
| Comp. Ex. 3 | Used | 140->160 | DMAc | 20 | 121,585 |
| Ex. 1-E1 | Used | 160 | DMAc + ethanol | 5 | 35,600 |
| Ex. 1-E2 | Used | 160 | DMAc + ethanol | 10 | 161,332 |
| Ex. 1-E3 | Used | 160 | DMAc + ethanol | 15 | 206,459 |
| Ex. 1-E4 | Used | 160 | DMAc + ethanol | 20 | 213,803 |
| Ex. 2-M2 | Used | 160 | DMAc + methanol | 10 | 181,768 |
| Ex. 2-M3 | Used | 160 | DMAc + methanol | 15 | 218,925 |
| Ex. 2-M4 | Used | 160 | DMAc + methanol | 20 | 220,989 |
| Ex. 3-P2 | Used | 160 | DMAc + isopropanol | 10 | 124,450 |
| Ex. 3-P3 | Used | 160 | DMAc + isopropanol | 15 | 205,002 |
| Ex. 3-P4 | Used | 160 | DMAc + isopropanol | 20 | 221,357 |

*GPC used; $M_w$ (weight average molecular weight); PMMA standard used; eluent: NMP + 0.05M LiBr; 50° C.

As can be seen from the above results, according to the embodiments, it is possible to obtain a molecular weight of polymer equal to or higher than the molecular weight of polymer obtained from the method for synthesizing a hydrocarbon-based electrolyte polymer according to the related art, even when the reaction time is reduced. Thus, the method and polymerization solvent disclosed herein is very useful for a mass production of a hydrocarbon-based electrolyte polymer.

While the exemplary embodiments have been shown and described, it will be understood by those skilled in the art that various changes in form and details may be made thereto without departing from the spirit and scope of the present disclosure as defined by the appended claims. In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A mixture for synthesizing a sulfonated polyether sulfone consisting of
a monomer,
a polymerization catalyst and
a polymerization solvent,
wherein the monomer is a mixture of (i) 4,4'-dilpidroxy-diphenyl or bisphenol A; (ii) bis(4-chlorophenyl) sulfone or bis(4-fluorophenyl)sulfone; and (iii) 3,3'-disulfonated-4,4'-chlorodiphenylsulfone or 3,3'-disulfonated-4,4'-fluorodiphenylsulfone,
wherein the polymerization solvent is a mixed solvent of a first solvent and a second solvent,
the first solvent being dimethyl acetamide, and
the second solvent being methanol,
wherein a mixing ratio of the first solvent and the second solvent is 15-30:10-20 by volume.

2. A method for synthesizing a sulfonated polyether sulfone, comprising:
subjecting a mixture consisting of a monomer, a polymerization catalyst, and a polymerization solvent to a polymerization to obtain the sulfonated polyether sulfone,
wherein the monomer is a mixture of (i) 4,4'-dihydroxy-diphenyl or bisphenol A; (ii) bis(4-chlorophenyl) sulfone or bis(4-fluorophenyl)sulfone; and (iii) 3,3'-disulfonated-4,4'-chlorodiphenylsulfone or 3,3'-disulfonated-4,4'-fluorodiphenylsulfone,
wherein the polymerization solvent is a mixed solvent of a first solvent and a second solvent,
the first solvent is dimethyl acetamide, and
the second solvent is methanol, and
wherein a mixing ratio of the first solvent and the second solvent is 15-30:10-20 by volume.

3. The method according to claim 2, wherein, during the polymerization, the mixture is heated to a polymerization temperature without reflux.

4. The method according to claim 2, wherein an evaporated second solvent and water produced from a polymerization reaction are removed.

5. The method according to claim 4, wherein a Dean Stark apparatus is used to remove the evaporated second solvent and water produced from the polymerization reaction.

6. The method according to claim 2, wherein the polymerization is carried out at 150-170° C. for 15-20 hours to obtain the sulfonated polyether sulfone having a weight average molecular weight of 100,000-250,000.

* * * * *